(12) United States Patent
Wen-Hsiang

(10) Patent No.: US 7,004,695 B1
(45) Date of Patent: Feb. 28, 2006

(54) FASTENING DEVICE

(75) Inventor: Hsieh Wen-Hsiang, Chang-Hua (TW)

(73) Assignee: Good Success Corp., (TW)

( * ) Notice: Subject to any disclaimer, the term of this patent is extended or adjusted under 35 U.S.C. 154(b) by 0 days.

(21) Appl. No.: 10/994,386

(22) Filed: Nov. 23, 2004

(51) Int. Cl.
  *A44B 11/00* (2006.01)
  *B60P 3/06* (2006.01)
(52) U.S. Cl. .......................... 410/21; 410/23; 410/100
(58) Field of Classification Search .................. 410/21, 410/23, 100; 24/265 CD, 115 R, 115 K, 24/115 M, 68 R, 69 ST, 69 CT, 68 E, 68 CD; 248/499
See application file for complete search history.

(56) References Cited

U.S. PATENT DOCUMENTS

| | | | | |
|---|---|---|---|---|
| 2,710,436 A | * | 6/1955 | Davis | 24/68 CD |
| 2,743,497 A | * | 5/1956 | Davis | 24/196 |
| 2,754,560 A | * | 7/1956 | Warner et al. | 24/196 |
| 3,128,106 A | * | 4/1964 | Zinkel, Jr. | 41/41 C |
| 3,274,656 A | * | 9/1966 | Hamann | 24/196 |
| 3,365,756 A | * | 1/1968 | Bayon | 24/700 |
| 3,423,799 A | * | 1/1969 | Higuchi | 24/68 CD |
| 3,574,246 A | * | 4/1971 | Norton et al. | 24/68 CD |
| 4,001,920 A | * | 1/1977 | Johnson | 24/193 |
| 4,395,796 A | * | 8/1983 | Akaura et al. | 24/68 CD |
| 4,608,735 A | * | 9/1986 | Kasai | 24/196 |
| 4,796,336 A | * | 1/1989 | Scully | 24/68 CD |
| 4,809,953 A | * | 3/1989 | Kurita et al. | 254/25 C |
| 5,173,996 A | * | 12/1992 | Chou | 24/68 CD |
| 6,148,486 A | * | 11/2000 | Uehara et al. | 24/170 |

* cited by examiner

*Primary Examiner*—H. Gutman
(74) *Attorney, Agent, or Firm*—Banner & Witcoff, Ltd.

(57) ABSTRACT

A fastening device for fastening a rope comprises a main body which includes a base, two spaced-apart legs extending longitudinally from the base and each having one end extending away from the base, and a first cross bar, a second cross bar and a third cross bar spaced from one another and disposed transversely between the two legs in that order from the base to the ends of the legs. The third cross bar is movable to a first position proximate the second cross bar or to second position distal from the second cross bar. First, second and third spaces are defined by the third cross bar with the second cross bar, the second cross bar with the first cross bar, and the first cross bar with the base, respectively, for passage of the rope. A ring member is pivotally mounted in the ends of the legs.

11 Claims, 8 Drawing Sheets

FASTENING DEVICE

BACKGROUND OF THE INVENTION

1. Field of the Invention

The present invention relates to a fastening device for fastening a rope, more particularly to a fastening device of the type in which a pair of ropes can be attached for securing an object or article.

2. Description of the Related Art

Generally, when transporting automobiles from a source to a destination by cargo vessels, a fastening device is used to fasten two ropes which are connected respectively to an automobile and the deck of the ship, the two ropes being threaded through and fastened in the fastening device. The fastening device with the ropes is usually provided between the automobile and the ship body, and the two ropes are attached to both the automobile and the ship body so as to position the automobile in place. As shown in FIGS. 1 and 2, the conventional fastening device 10 includes a base 17 and two spaced apart webs 11,12 extending longitudinally from the base 17; a first cross plate 15 and a second cross plate 16 which are spaced from one another and disposed transversely between the two webs 11,12, the first cross plate 15 defining a first space 13 with the second cross plate 16 and the second cross plate 16 defining a space 14 with the base 17; and a ring member 18 that is pivotably mounted in the ends of the two webs 11,12.

Such fastening device is used to hold two ropes 20,21, as shown in FIG. 2. From beneath the fastening device, a second section 202 of the first rope 20 is passed through the space 121 defined by the two ends of the webs 11,12 and, crossing over the upper sides of the first and second cross plates 15,16, is inserted downward into the second space 14 and then, passing under the second cross plate 16, is subsequently turned upwardly out of the first space 13 and, passing over the first cross plate 15, is finally inserted downward into the space 121 defined by the two ends of the two webs 11,12 and then pulled in the direction toward the base 17 so that the first section 201 of the rope 20 lies in juxtaposition with a second section 202 of the first rope 20, as shown in FIG. 2. The second rope 21 is inserted into the ring 18 and the two ends thereof are tied to form a closed loop.

In use, the loop of the second rope 21 is hooked to a fixing hook provided on the ship body (not shown in the drawings). An end of the second section 202 of the first rope 20 is used to tie the body of the automobile (not shown in the drawings). In this way, the automobile is fixed in position. The fastening device 10 allows for fastening of the first rope 21 and the second rope 20 and provides the use and function of fixing an automobile in place, but still has the following shortcomings:

First of all, because the first rope 20 only goes around the second cross plate 16 and then around the first cross plate 15, in addition to the smoothness of the surface of the two cross plates 15,16, there is not much frictional resistance provided relative to the first rope 20. Thus, when force is applied to pull the second section 202 of the first rope 20 in a direction opposite to the second rope 21, undesirable sliding movement of the first rope 20 could very well occur, leading to the drawback of poor quality of attachment of the first rope 20 to the fastening device.

Secondly, because after the first rope 20 is fastened to the fastening device, the first section 201 thereof is often in tight contact with the base 17, this causes the drawback that the operation of pulling up the base 17 to loosen the first rope 20 is not easy.

SUMMARY OF THE INVENTION

Therefore, a main object of the present invention is to provide a fastening device with improved fastening effect upon a rope so as to enhance the quality of the rope's attachment to the fastening device.

Accordingly, the present invention provides a fastening device for fastening a rope which comprises a main body including a base, two spaced-apart legs extending longitudinally from the base and each having one end extending away from the base, and a first cross bar, a second cross bar and a third cross bar disposed transversely between the two legs and arranged in spaced-apart manner in a direction from the base to the ends of the legs wherein the first cross bar is adjacent the base, the second cross bar is adjacent the first cross bar and the third cross bar is adjacent the second cross bar, the third cross bar being movable to a first position proximate the second cross bar or to a second position distal from the second cross bar, the third cross bar defining a first space with the second cross bar, the second cross bar defining a second space with the first cross bar and the first cross bar defining a third space with the base; and a ring member pivotally mounted in the ends of the two legs, wherein the first, second and third spaces are adapted to permit passage of the rope, and the third cross bar is movable toward the second cross bar to the first position to clamp a portion of the rope against the second cross bar when the rope is pulled.

In a more preferred embodiment, the three cross bars are provided with roughened outer surfaces to enhance frictional resistance against the rope, and the third cross bar is provided with a concave portion for increasing the clamping area for the rope and a convex portion for smoother passage of the rope.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

The construction of a preferred embodiment of the fastening device according to the present invention will now be described in greater detail below. It should be noted that the terms used in the entire text herein to indicate the relative position, such as "upward," "downward" and "underneath," are based on the normal operating position of the fastening device as shown in FIGS. 3, 4 and 5.

Figure 1:
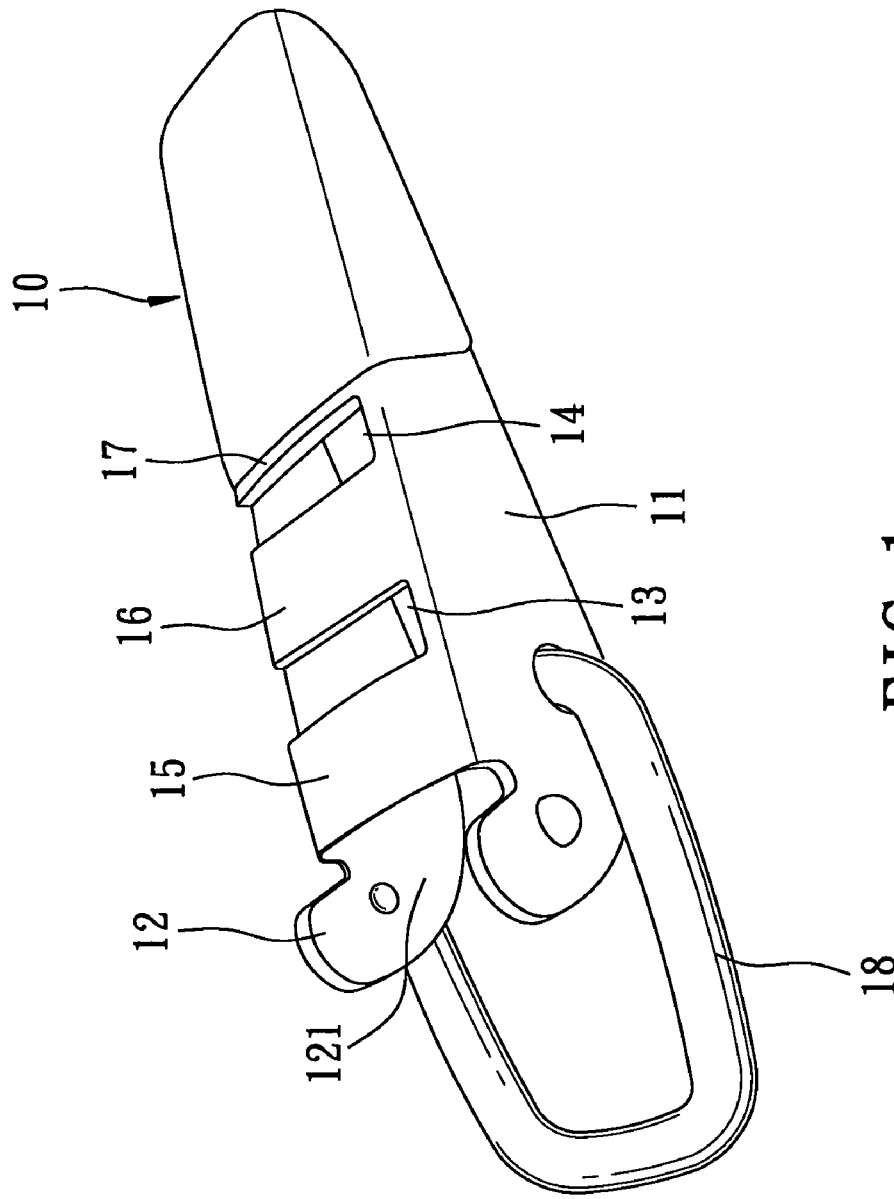
FIG. 1 is a perspective view of a fastening device of the prior art.
Figure 2:
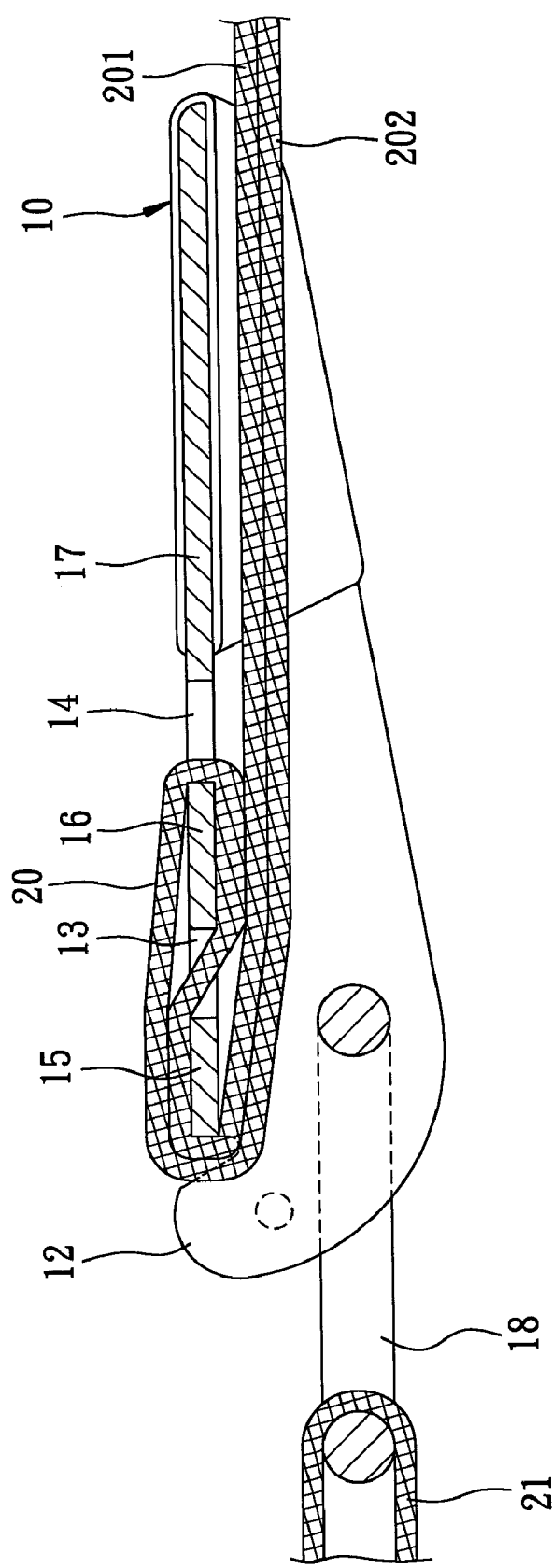
FIG. 2 is a sectional view of the fastening device of the prior art showing the fastening of a rope therein.
Figure 3:
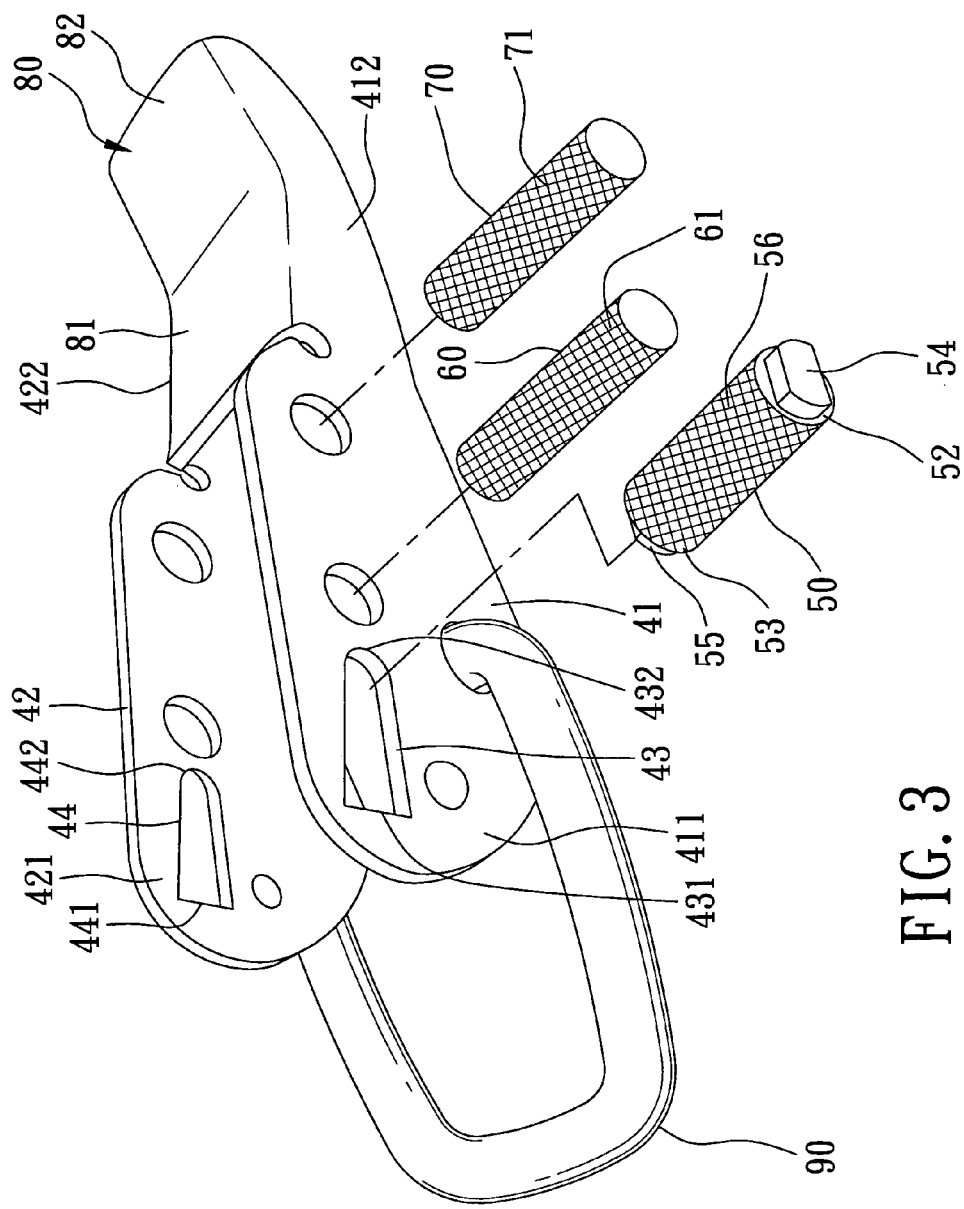
FIG. 3 is an exploded, perspective view of a preferred embodiment of the fastening device according to the present invention, the elements being shown in exploded view so as to more clearly illustrate the movable third cross bar in conjunction with the first cross bar and second cross bar.
Figure 4:
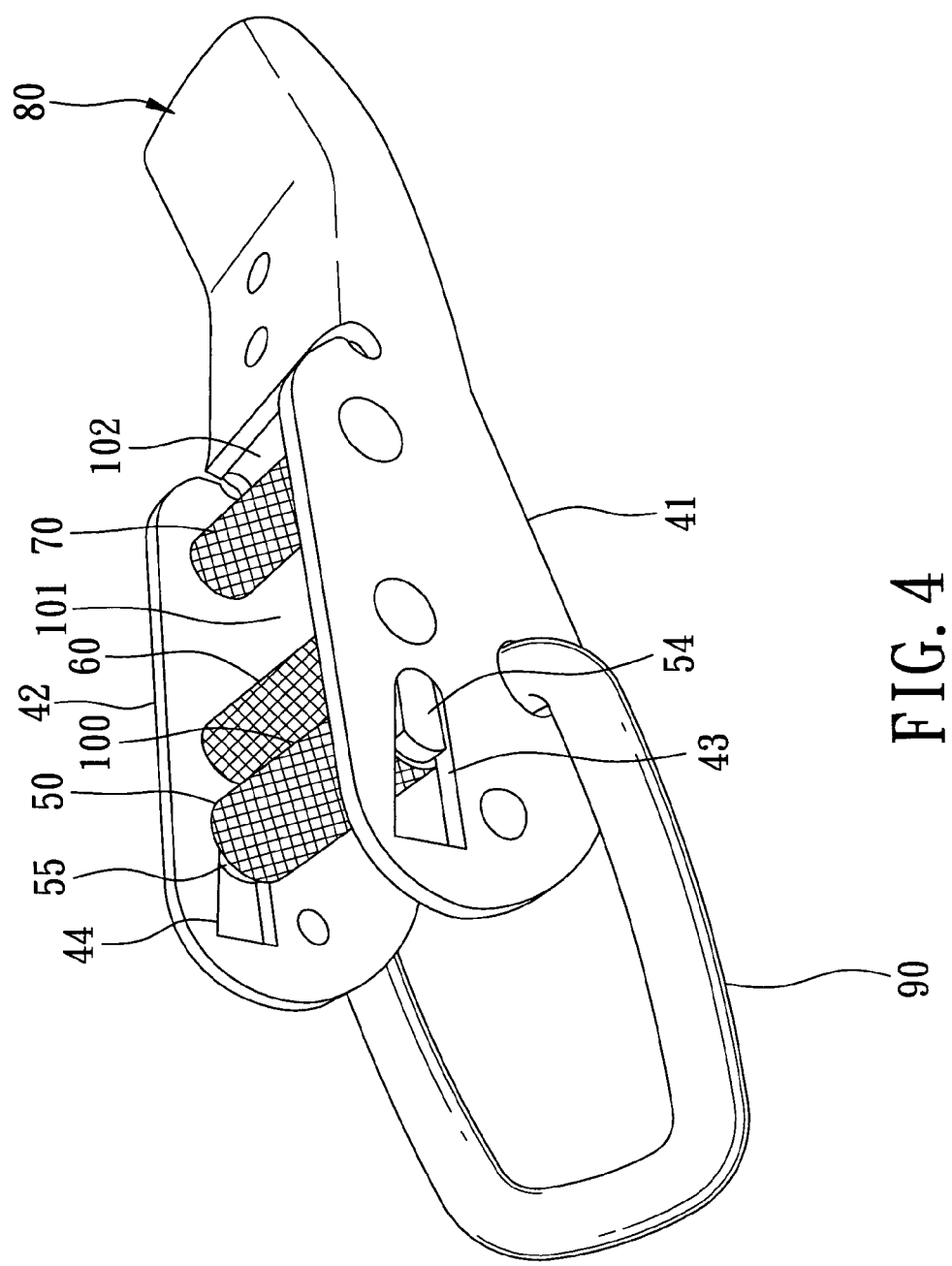
FIG. 4 is a perspective view of the preferred embodiment as the elements are assembled.
Figure 5:
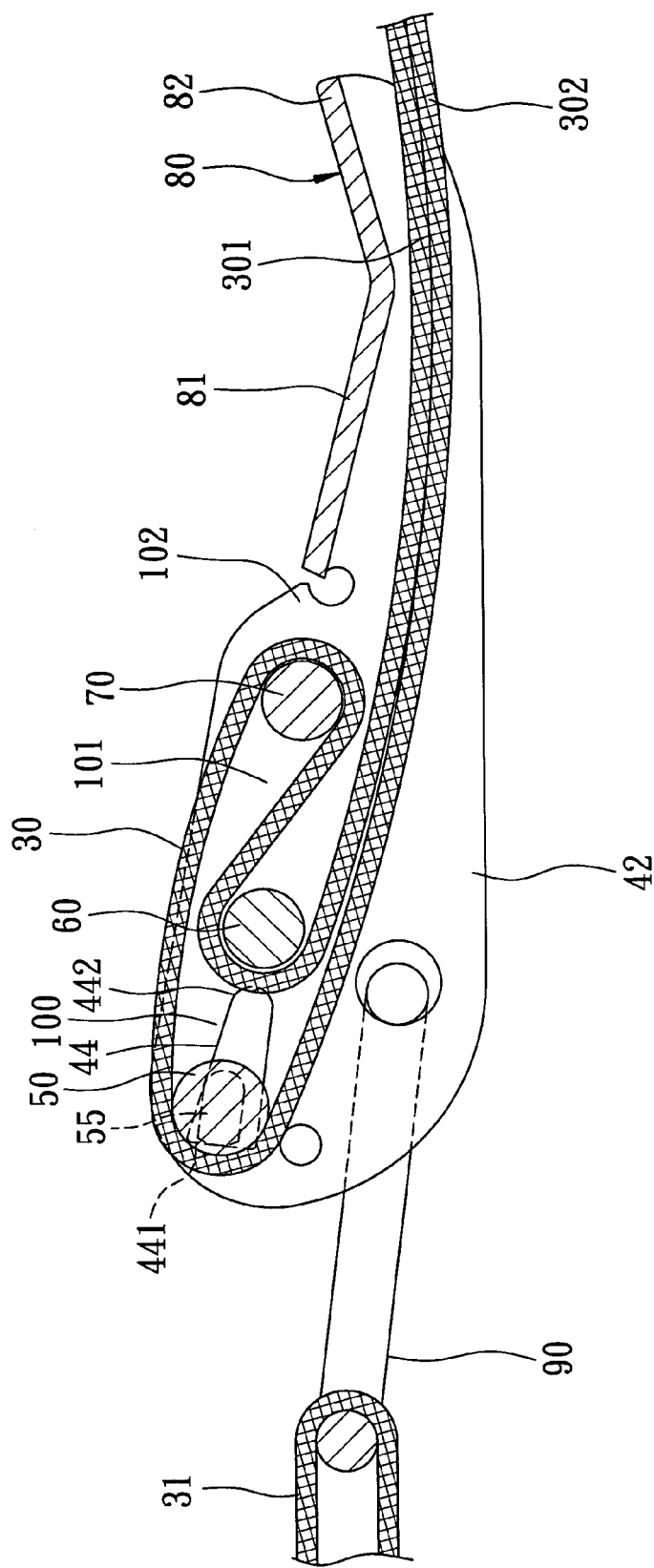
FIG. 5 is a sectional view of the first preferred embodiment in the assembled form, showing a first rope and a second rope being fastened to the fastening device of the preferred embodiment.

As shown in FIGS. 3, 4 and 5, the fastening device according to the present invention is used to fix an object 110 (as that shown in FIG. 8) with a first rope 30 and a second rope 31 that are inserted therethrough and fastened thereto. The preferred embodiment as shown comprises a main body which includes a base 80, two spaced-apart legs 41,42 extending longitudinally from the base 80 and each having one end 411,421 distal from the base 80, and a first cross bar 70, a second cross bar 60 and a third cross bar 50 interposed between the two legs 41,42; and a ring member 90 pivotally mounted in the two ends 411,421 of the two legs 41,42.

The first cross bar 70, second cross bar 60 and third cross bar 50 are spaced from one another and sequentially arranged in that order from the base to the ends of the legs 41,42, such that the third cross bar 50 defines a first space 100 with the second cross bar 60 adjacent thereto, the second cross bar 60 defines a second space 101 with the first cross bar 50 adjacent thereto, and the first cross bar 70 defines a third space 102 with the base 80 adjacent thereto. Preferably, the first cross bar 70, second cross bar 60 and third cross bar 50 are each provided with a roughened outer surface 71,61, 56 and are of a substantially circular cross section.

The two legs 41,42 are each formed with an elongated slot 43,44 adjacent the two ends 411,421 thereof. The slots 43,44 are elongated in the longitudinal direction of the legs 41,42 and are preferably designed to taper in size gradually from broader ends 431,441 distal from the second cross bar 60 to tapered ends 432,442 proximate the second cross bar 60.

The two opposite ends 52,53 of the third cross bar 50 are inserted movably into the slots 43,44, respectively. Preferably, the two opposite ends 52,53 are each provided with an insert piece 54,55 which is elongated in the longitudinal direction of the legs 41,42 and which is inserted into a respective one of the two slots 43,44 such that the third cross bar 50 is displaceable laterally but is not rotatable. Each insert piece 54,55 has a flat face in sliding contact with an edge confining each slot 43,44. Thus, when the insert pieces 54,55 are moved to the tapered ends 432,442 of the slots 43,44, the third cross bar 50 will be immovably fixed and will not wobble, and consequently, excellent stability is achieved.

The base 80 serves as a connection between the two legs 41,42 and enhances the overall strength of the fastening device. The base 80 includes a flat section 81 and a bent lever section 82 upwardly inclining with respect to the flat portion 81 in a direction away from the two legs 41,42.

The ring member 90 is pivotally mounted in the ends 411,421 of the legs 41,42.

Figure 6:
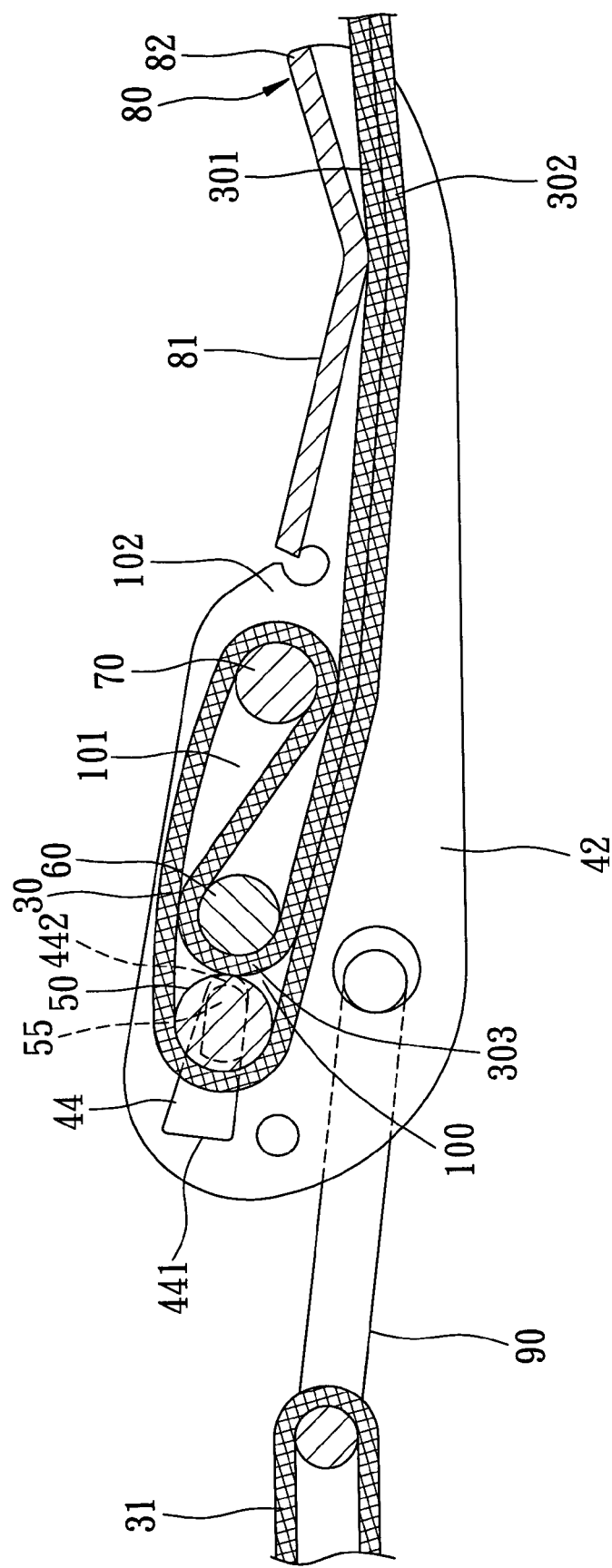
FIG. 6 is a sectional view similar to FIG. 5, but with the third cross bar being moved toward the second cross bar.

The fastening device of the present invention is used to fasten two ropes 30,31, with the first rope 30 fastened to the main body, and the second rope 31 to the ring member, of the fastening device. As shown in FIGS. 5 and 6 in conjunction with FIGS. 3 and 4, a second portion 302 of the first rope 30 is inserted, from underneath, into the space between the two ends 411,421 of the two legs 41,42, then extended over the third cross bar 50, second cross bar 60 and first cross bar 70, then threaded downward through the space 102 passing around the first cross bar 70, then inserted upwardly into the second space 101 passing over the second cross bar 60, then inserted downward into the first space 100, and then finally, the first portion 301 is pulled toward the direction of the base 80 so that the first portion 301 lies in juxtaposition with a second portion 302 of the first rope 30, underneath the base 80. Pulling the second portion 302 of the first rope 30 will displace the third cross bar 50 in a direction toward the second cross bar 60, that is, the inserted pieces 54,55 are urged to move toward the tapered ends 432,442 of the slots 43,44, thereby reducing the space 100 to clamp tightly a third portion 303 of the first rope 30 that is located in the space 100 between the third cross bar 50 and second cross bar 60, as best shown in FIG. 6. The first rope 30 is thus securely fastened in the fastening device.

Figure 8:
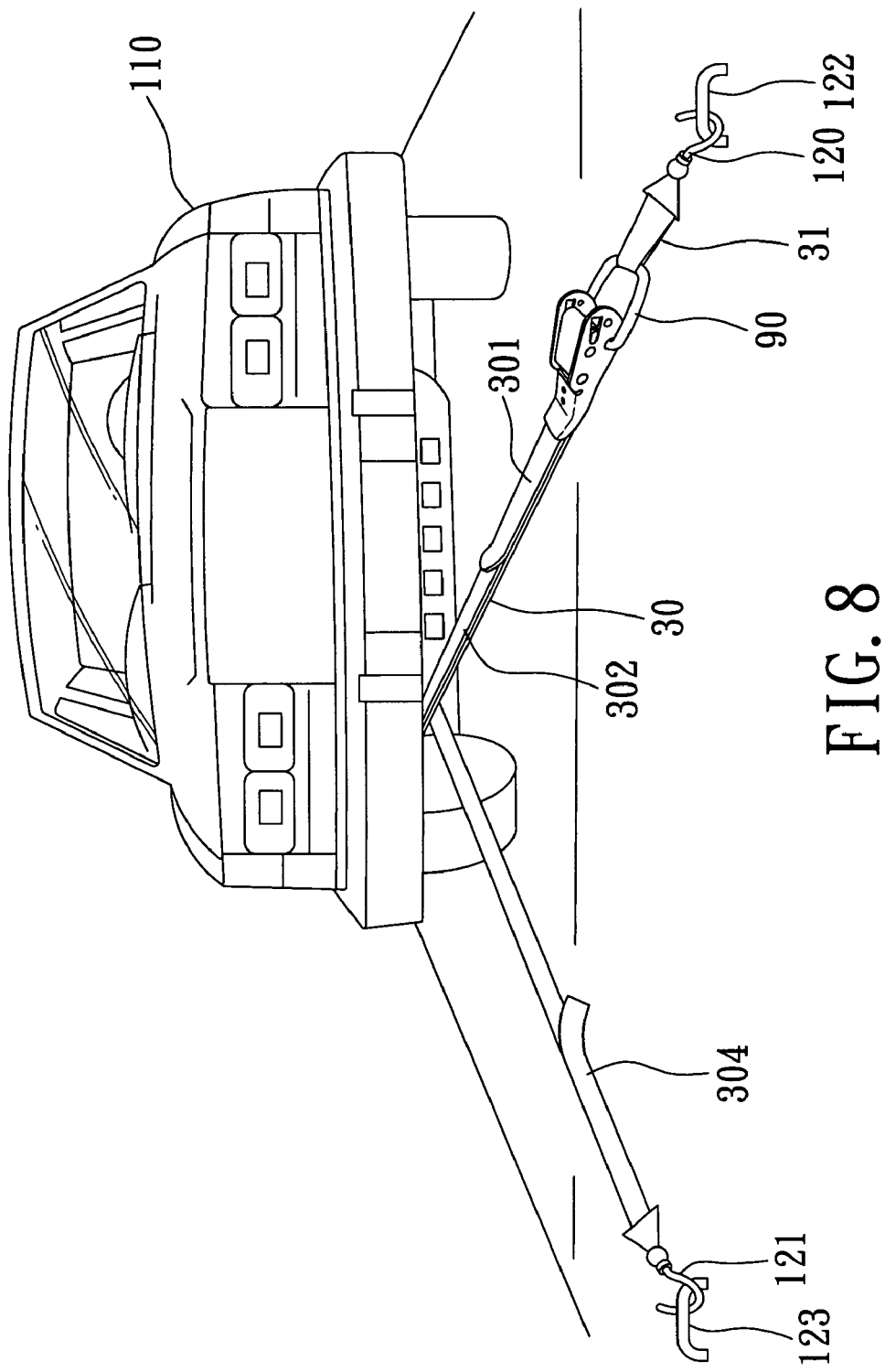
FIG. 8 is a perspective view showing the preferred embodiment in use.

Meanwhile, the second rope 31 is inserted into the ring member 90 and the two ends thereof are tied to form a closed loop (see FIG. 8).

The manner in which an object 110, such as an automobile, is fixed to the deck of a freighter, such as a cargo ship, for transport will now be described with reference to FIG. 8. A first hook 120 is first attached to the loop of the second rope 31, and this first hook 120 is hooked onto a corresponding first fixing member 122 provided on the ship body. Then, the second portion 302 of the first rope 30 is used to tie the object 110, after which a second hook 121 is attached to an end part 304 of the second portion 302 of the first rope 30. The second hook 121 is hooked onto a corresponding second fixing member 123 provided on the ship body. The object 110 is thus fixed in position.

Figure 7:
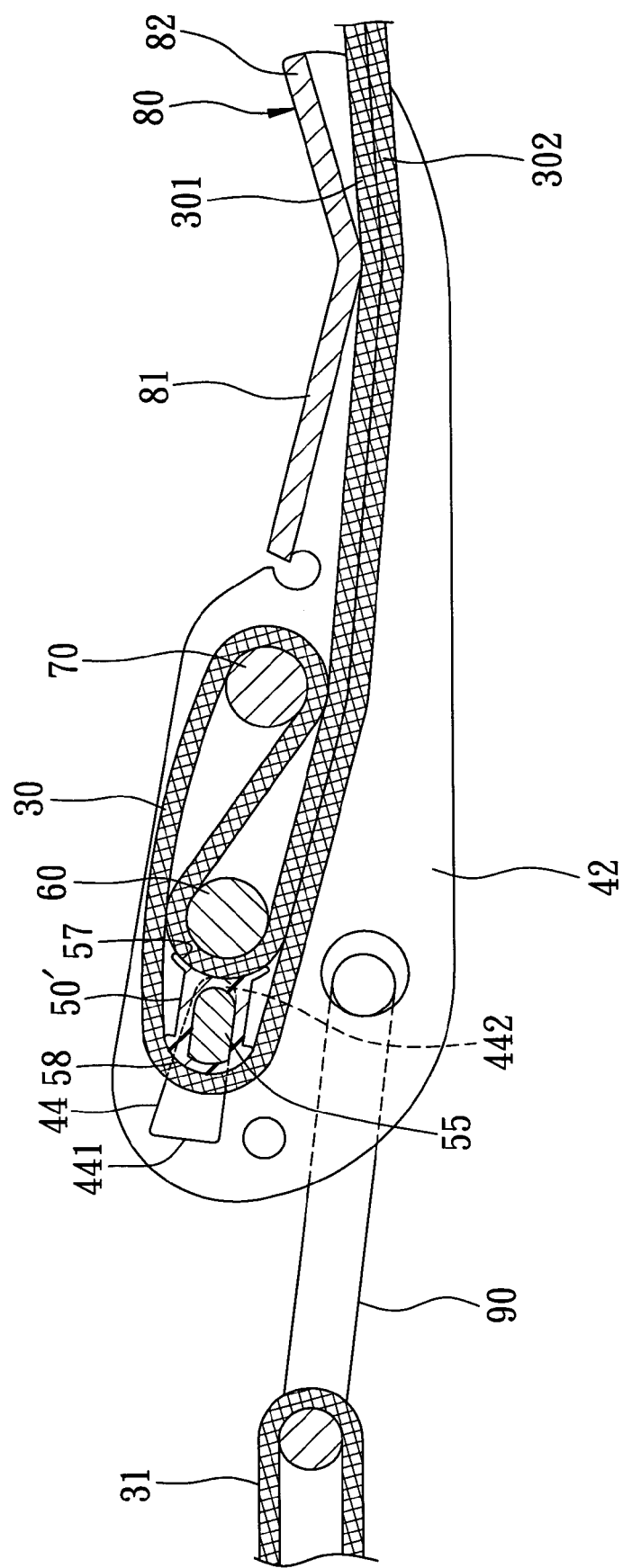
FIG. 7 is a sectional view similar to FIG. 6, but showing an alternative third cross bar.

With reference to FIG. 7, the third cross bar 50 may be replaced by an alternative third cross bar 50' which has an outer surface with a concave portion 57 facing the second cross bar 60 and a convex portion 58 opposite to the concave portion 57. The concave portion 57 and the second cross bar 60 are complementary in shape thereby defining therebetween a larger clamping area for the first rope 30. This improves the fastening of the first rope 30 to the fastening device. As for the convex portion 58, this design has the effect of rendering a smoother passage of the first rope over the third cross bar 50.

The third cross bar 50 shown in FIGS. 3 and 5 may be made of metal. The alternative third cross bar 50' may be made of plastic as shown in FIG. 7.

In conclusion of the aforesaid, the fastening device of the present invention has the following effects and advantages and, hence, can indeed achieve the objects of the present invention:

First of all, because in the present invention the first rope 30 is passed over the third cross bar 50 then over the second cross bar rod 60 and first cross bar 70, and since the three cross bars 50,60,70 are provided with roughened outer surfaces 56,61,71 which enhance the frictional resistance against the first rope 30, and further, because the first rope is clamped tightly in place between the third cross bar 50 and the second cross bar 60, the fastening effect with respect to the first rope 30 can be effectively enhanced. That is, the first rope 30 will be securely fastened in the fastening device and the chances of accidental detachment or loosening of the first rope 30 from the fastening device are effectively diminished. Furthermore, the object 110 can be effectively fixed in place. In other words, the present invention has the effect and advantage of increasing the quality of fastening.

Secondly, because the base 80 of the present invention is provided with a bent lever section 82, the fastening device can be conveniently grasped and turned. This results in the effect and advantage of convenient loosening of the first rope 30.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A fastening device for fastening a rope, comprising:
    a main body including a base, two spaced-apart legs extending longitudinally from said base and each having one end extending away from said base, and a first cross bar, a second cross bar and a third cross bar disposed transversely between said two legs and arranged in spaced-apart manner in a direction from said base to said ends of said legs wherein said first cross bar is adjacent said base, said second cross bar is adjacent said first cross bar and said third cross bar is adjacent said second cross bar, said third cross bar being movable to a first position proximate said second cross bar or to a second position distal from said second cross bar, said third cross bar defining a first space with said second cross bar, said second cross bar defining a second space with said first cross bar and said first cross bar defining a third space with said base; and
    a ring member pivotally mounted in said ends of said two legs,
    wherein said first, second and third spaces are adapted to permit passage of the rope, and said third cross bar is movable toward said second cross bar to said first position to clamp a portion of the rope against said second cross bar when the rope is pulled.

2. The fastening device of claim 1, wherein said two legs are provided with two slots, respectively, which are elongated in the longitudinal direction of said legs, and said third cross bar has two opposite ends inserted movably into said two slots, respectively.

3. The fastening device of claim 1, wherein said third cross bar is provided with a roughened outer surface.

4. The fastening device of claim 1, wherein said first cross bar is provided with a roughened outer surface.

5. The fastening device of claim 1, wherein said second cross bar is provided with a roughened outer surface.

6. The fastening device of claim 1, wherein said first and second cross bars are both provided with a roughened outer surface.

7. The fastening device of claim 1, wherein said base is composed of a flat section proximate said two legs and a bent lever section distal from said two legs and connected to said flat section.

8. The fastening device of claim 1, wherein said third cross bar has an outer surface provided with a concave portion facing said second cross bar.

9. The fastening device of claim 8, wherein said outer surface of said third cross bar is provided with a convex portion opposite said concave portion.

10. The fastening device of claim 2, wherein said two slots of said two legs taper in size toward said second cross bar thus forming two tapered ends proximate to said second cross bar, respectively, said third cross bar being in said first position when said two opposite ends of said third cross bar are moved to said tapered ends.

11. The fastening device of claim 10, wherein each of said opposite ends of said third cross bar has an insert piece inserted into one of said slots, said insert piece being elongated in said longitudinal direction of said legs and having a flat face in sliding contact with an edge confining said one of said slots.

* * * * *